United States Patent [19]

Takats

[11] Patent Number: 4,807,516

[45] Date of Patent: Feb. 28, 1989

[54] FLIGHT CONTROL SYSTEM EMPLOYING THREE CONTROLLERS OPERATING A DUAL ACTUATOR

[75] Inventor: Imre J. Takats, Bellevue, Wash.

[73] Assignee: The Boeing Company, Seattle, Wash.

[21] Appl. No.: 41,872

[22] Filed: Apr. 23, 1987

[51] Int. Cl.$^4$ ............................ G05B 19/02; F15B 9/03
[52] U.S. Cl. ..................................... 91/363 A; 91/509; 244/194; 318/564
[58] Field of Search ........................ 91/358 R, 360, 361, 91/363 A, 364, 367, 509; 318/564; 244/194

[56] References Cited

U.S. PATENT DOCUMENTS

| | | | |
|---|---|---|---|
| 3,462,660 | 8/1969 | Barltrop | 318/564 |
| 3,585,902 | 6/1971 | Anderson | 91/363 A |
| 4,035,705 | 7/1977 | Miller . | |
| 4,105,900 | 8/1978 | Martin . | |
| 4,120,469 | 10/1978 | Westermeier . | |
| 4,209,734 | 6/1980 | Osder . | |
| 4,257,311 | 3/1981 | Barnsley et al. | 91/363 A |
| 4,345,191 | 8/1982 | Takats et al. | 91/363 A |
| 4,370,706 | 1/1983 | Doniger et al. . | |
| 4,447,769 | 5/1984 | Corney . | |
| 4,517,639 | 5/1985 | Ferrell et al. . | |
| 4,542,679 | 9/1985 | Murphy et al. | 91/509 X |
| 4,567,813 | 2/1986 | Garnjost | 91/509 X |

FOREIGN PATENT DOCUMENTS 0064501 4/1983 Japan .
2084349A 9/1981 United Kingdom .

OTHER PUBLICATIONS

"Synchronization of Two Controllers Operating in a Duplex Mode", *IBM Technical Disclosure Bulletin*, vol. 18, No. 12, May 1976.

Primary Examiner—Edward K. Look
Attorney, Agent, or Firm—Seed and Berry

[57] ABSTRACT

An aircraft flight control system for use with a dual or tandem hydraulic actuator coupled to a flight control surface through an actuating rod. Each half of the tandem actuator is controlled by a respective electrohydraulic servovalve. Each electrohydraulic servovalve is controlled by signals applied to either of two actuating coils. Control signals are applied to the actuating coils from three controllers. The control signals are generated as a function of the difference between the flight control signal and a feedback signal indicative of the position of the actuating rod. Each electrohydraulic servovalve includes a pair of linear variable differential transformers generating feedback signals indicative of the position of the valve stem in each electrohydraulic servovalve. The valve feedback signals are compared to each other and to reference signals corresponding to the expected value of such feedback signals in order to detect and identify malfunctions in the flight control system. In one embodiment, the electrohydraulic servovalves are controlled by two channels of a primary controller in normal operation. In the event of a malfunction, control is transferred to one of two secondary controllers. In another embodiment, the electrohydraulic servovalves are controlled by respective primary controllers, with control being transferred to one of two channels of a secondary controller in the event of a malfunction.

21 Claims, 9 Drawing Sheets

LVDT = LINEAR VARIABLE DIFFERENTIAL TRANSFORMER
EHV = DUAL-COIL ELECTROHYDRAULIC SERVOVALVE
B.P = BYPASS VALVE
CH = CHANNEL
FCC = FLIGHT CONTROL COMPUTER

FIG. 7

| POSSI-BILITIES | SIGNALS TO COMPARATORS | | | | FAILURE SIGNALS FROM COMPARATORS | | | | | | SWITCHING SIGNALS | | | | OPERATIONAL ACTIVE CHANNELS | | | | | | FAILURE OF CHANNELS |
|---|---|---|---|---|---|---|---|---|---|---|---|---|---|---|---|---|---|---|---|---|---|
| | 1B | 1BM | 2B | 2BM | $E_1$ | $E_2$ | $E_3$ | $E_4$ | $E_5$ | $E_6$ | $S_1$ | $S_2$ | $S_3$ | $S_4$ | 1B | 1BM | 2B | 2BM | 1A | 2C | |
| 1 | 0 | 0 | 0 | 0 | 0 | 0 | 0 | 0 | 0 | 0 | 0 | 0 | 0 | 0 | 1 | 0 | 1 | 0 | 0 | 0 | 0 |
| 2 | 1 | 0 | 0 | 0 | 1 | 1 | 1 | 0 | 0 | 0 | 1 | 0 | 0 | 0 | 0 | 1 | 1 | 0 | 0 | 0 | 1 |
| 3 | 0 | 1 | 0 | 0 | 1 | 0 | 0 | 1 | 0 | 0 | 0 | 1 | 0 | 0 | 1 | 0 | 1 | 0 | 0 | 0 | |
| 4 | 0 | 0 | 1 | 0 | 0 | 0 | 0 | 1 | 1 | 1 | 0 | 0 | 1 | 1 | 1 | 0 | 0 | 1 | 0 | 0 | |
| 5 | 0 | 0 | 0 | 1 | 0 | 1 | 1 | 1 | 1 | 1 | 0 | 0 | 0 | 1 | 1 | 0 | 1 | 0 | 0 | 0 | |
| 6 | 1 | 1 | 0 | 0 | 1 | 1 | 1 | 1 | 1 | 1 | 1 | 1 | 1 | 0 | 0 | 0 | 1 | 0 | 1 | 0 | 2 |
| 7 | 1 | 0 | 1 | 0 | 1 | 1 | 1 | 0 | 1 | 1 | 1 | 0 | 0 | 0 | 1 | 1 | 0 | 1 | 0 | 0 | |
| 8 | 1 | 0 | 0 | 1 | 1 | 1 | 0 | 1 | 1 | 1 | 1 | 1 | 0 | 1 | 0 | 1 | 1 | 0 | 0 | 0 | |
| 9 | 0 | 1 | 1 | 0 | 1 | 1 | 1 | 1 | 1 | 1 | 0 | 0 | 1 | 1 | 1 | 0 | 0 | 1 | 0 | 0 | |
| 10 | 0 | 1 | 0 | 1 | 1 | 1 | 1 | 1 | 1 | 1 | 1 | 1 | 1 | 1 | 1 | 0 | 1 | 0 | 0 | 0 | |
| 11 | 1 | 1 | 1 | 0 | 1 | 1 | 1 | 1 | 1 | 1 | 1 | 1 | 1 | 1 | 0 | 0 | 0 | 0 | 1 | 0 | 3 |
| 12 | 1 | 0 | 1 | 1 | 1 | 1 | 1 | 1 | 1 | 1 | 1 | 1 | 1 | 1 | 0 | 0 | 0 | 0 | 1 | 0 | |
| 13 | 1 | 1 | 0 | 1 | 1 | 1 | 1 | 1 | 1 | 1 | 1 | 1 | 1 | 1 | 0 | 0 | 0 | 0 | 0 | 1 | |
| 14 | 0 | 1 | 1 | 1 | 1 | 1 | 1 | 1 | 1 | 1 | 1 | 1 | 1 | 1 | 0 | 0 | 0 | 0 | 0 | 1 | |
| 15 | 1 | 1 | 1 | 0 | 1 | 1 | 1 | 1 | 1 | 1 | 1 | 1 | 1 | 1 | 0 | 0 | 0 | 0 | 1 | 1 | 4 |
| 16 | 1 | 1 | 1 | 1 | 1 | 1 | 1 | 1 | 1 | 1 | 1 | 1 | 1 | 1 | 0 | 0 | 0 | 0 | 1 | 1 | |

1-FAILED 0-GOOD | 0-NO ERROR SIGNALS 1-ERROR SIGNALS | 0-NO SWITCHING SIGNALS 1-SWITCHING SIGNALS | 1-OPERATIONAL ACTIVE CHANNELS 0-NON-OPERATIONAL CHANNELS

FIG. 9

| POSSI-BILITIES | FAILURE OF CHANNEL | | | | BYPASS SIGNAL TO | | | | BYPASS VALVE IN BYPASS | | OPERA-TIONAL ACTUATOR | | FAILURE OF CHANNELS |
|---|---|---|---|---|---|---|---|---|---|---|---|---|---|
| | EHV "1" | | EHV "2" | | B.V. "1" | | B.V. "2" | | | | | | |
| | CH.1B | CH.1A | CH.2B | CH.2C | FROM "B" | FROM "A" | FROM "B" | FROM "C" | "1" | "2" | "1" | "2" | |
| 1 | 0 | 0 | 0 | 0 | 0 | 0 | 0 | 0 | 0 | 0 | 0 | 0 | 0 |
| 2 | 1 | 0 | 0 | 0 | 1 | 0 | 0 | 0 | 0 | 0 | 0 | 0 | 1 |
| 3 | 0 | 1 | 0 | 0 | 0 | 1 | 0 | 0 | 0 | 0 | 0 | 0 | 1 |
| 4 | 0 | 0 | 1 | 0 | 0 | 0 | 1 | 0 | 0 | 0 | 0 | 0 | 1 |
| 5 | 0 | 0 | 0 | 1 | 0 | 0 | 0 | 1 | 0 | 0 | 0 | 0 | 1 |
| 6 | 1 | 1 | 0 | 0 | 1 | 1 | 0 | 0 | 1 | 0 | 1 | 0 | 2 |
| 7 | 1 | 0 | 1 | 0 | 1 | 0 | 1 | 0 | 0 | 0 | 0 | 0 | 2 |
| 8 | 1 | 0 | 0 | 1 | 1 | 0 | 0 | 1 | 0 | 0 | 0 | 0 | 2 |
| 9 | 0 | 1 | 1 | 0 | 0 | 1 | 1 | 0 | 0 | 0 | 0 | 0 | 2 |
| 10 | 0 | 1 | 0 | 1 | 0 | 1 | 0 | 1 | 0 | 0 | 0 | 0 | 2 |
| 11 | 0 | 0 | 1 | 1 | 0 | 0 | 1 | 1 | 0 | 1 | 0 | 1 | 2 |
| 12 | 1 | 1 | 1 | 0 | 1 | 1 | 1 | 0 | 1 | 0 | 1 | 0 | 3 |
| 13 | 1 | 1 | 0 | 1 | 1 | 1 | 0 | 1 | 1 | 0 | 1 | 0 | 3 |
| 14 | 1 | 0 | 1 | 1 | 1 | 0 | 1 | 1 | 0 | 1 | 0 | 1 | 3 |
| 15 | 0 | 1 | 1 | 1 | 0 | 1 | 1 | 1 | 0 | 1 | 0 | 1 | 3 |
| 16 | 1 | 1 | 1 | 1 | 1 | 1 | 1 | 1 | 1 | 1 | 1 | 1 | 4 |

1-FAILED 0-GOOD    |    0-NO BYPASS SIGNAL 1-BYPASS SIGNAL    |    0-NO BYPASS 1-BYPASS    |    1-FAILED 0-GOOD ical Field This invention relates to aircraft flight control systems, and more particularly, to a redundant control system for hydraulic flight control actuators.

2. Background Art

Aircraft flight control surfaces, such as ailerons, elevators and rudders, are usually operated by hydraulic actuators, generally consisting of a hydraulic cylinder enclosing a piston mounted on an actuator rod. The hydraulic fluid applied to the hydraulic actuator s generally controlled by an electrohydraulic servovalve having at least one control coil receiving a control signal from a controller. In order to verify the correct operation of the actuator, a linear variable differential transformer may be coupled to the actuator rod. The linear variable differential transformer provides a feedback signal to the controller which indicates the position of the actuating rod. In a similar vein, a linear variable differential transformer may be mechanically coupled to the electrohydraulic servovalve stem to provide a monitor signal to the controller which indicates the position of the valve stem and hence the rate of actuator movement.

The safe operation of aircraft employing hydraulic control systems obviously depends upon the proper operation of the system. Furthermore, the high speed at which aircraft travel can prevent the detection of a flight control malfunction before the aircraft crashes, with attendant loss of life and property. It is thus necessary for hydraulic flight control systems to be built as "fail safe" as possible or else be able to operate effectively in the event of a failure, that is, it must be fail operational.

The typical approach to implementing a "fail safe" flight control system is to use redundant components in the system. A flight control sytem utilizing redundant components can continue to function after the malfunction of a single component. To further improve the reliability of redundant flight control systems, the number of redundant components can be increased to even more than two or even three identical components.

Theoretically, the reliability of a flight control system can reach any desired value by merely increasing the number of redundant components. However, in practice, the number of redundant components that can be used is limited by several factors. First, it is normally desirable to minimize the weight of aircraft employing flight control systems. The extra weight resulting from the use of redundant components unduly increases the weight of aircraft. Second, a greater number of redundant components increases the probability that at least one of the components will fail, thus producing an unacceptable mean time between failure for the entire system. Finally, the use of redundant components can easily multiply by several times the cost of the flight control systems. Therefore, it is important that optimum redundancy be achieved with a minimum number of components.

In the past, attempts have been made to combine dual-coil electrohydraulic servovalves with one or two digital controllers. However, the use of a single, dual-coil electrohydraulic servovalve, when controlled by either single or dual controllers, cannot satisfy the safety/reliability requirements. Moreover, the use of a dual-coil electrohydraulic valve and dual controllers can result in operating ambiguities in the event of a malfunction since it may not be possible to determine which controller and/or electrohydraulic servovalve coil has malfunctioned.

DISCLOSURE OF THE INVENTION

It is the primary object of this invention to provide a flight control system that achieves the optimum balance among many factors, including safety, reliability and expense, weight and mean time between system failure.

It is another object of the invention to provide a redundant fly-by-wire control system that utilizes conventional components in a unique manner.

It is still another object of the invention to provide a fly-by-wire flight control system that can achieve a variety of forms to permit such operational features as cross-channel voting and mutiple flight control computer inputs.

It is a further object of the invention to provide redundancy in a flight control system in such a manner that allows the system to be operated with a relatively large number of individual component failures.

These and other objects of the invention are provided by a flight control system receiving input flight control signals from a flight control computer to manipulate a flight control surface. A dual hydraulic actuator is used to manipulate the flight control surface. The dual actuator has an actuating rod connected to the flight control surface, and a pair of pistons are mounted on the actuating rod in respective first and second cylinders. The flow of hydraulic fluid into and out of the first and second cylinders is controlled by the first and second electrohydraulic servovalves, respectively. The electrohydraulic servovalves are, in turn, operated by respective signals applied to a pair of actuating coils. The system includes three controllers that receive the flight control signal and apply respective output signals to the four coils of the two electrohydraulic servovalves. The first controller is connected to one coil of the first electrohydraulic servovalve, the second controller is connected to one coil of the second electrohydraulic servovalve, and the third controller has two outputs that are connected to the other coils of the first and second electrohydraulic servovalves.

The operation of the controllers, electrohydraulic servovalves and actuator are monitored, and the controllers selectively enabled so that each of the electrohydraulic servovalves is operated by only one controller at a time. In the event of a malfunction in the performance of one electrohydraulic servovalve, or in a controller driving the electrohydraulic servovalve, the other controller connected to the electrohydraulic servovalve is enabled. Position sensors are coupled to the actuating rod to generate actuating rod position signals. The actuating rod position signals are used as negative feedback to the controllers to allow the controllers to generate the signals applied to the electrohydraulic servovalve actuating coils as a function of the difference between the flight control signal and each actuating rod position signal. The electrohydraulic servovalves preferably include valve position sensors providing valve-monitoring signals which indicate the operation of the valves. The valve monitor signals are compared to reference signals that correspond to the expected values of the valve reference signal in response to the current flight control signal. The reference signals are generated by model channels in the controllers that have a transfer characteristic that simulates the characteristic of the electrohydraulic servovalves' responses to the control signals.

BRIEF DESCRIPTION OF THE DRAWINGS

FIG. 7 is a truth table showing the operation of the primary controller of FIG. 1.

FIG. 9 is a truth table showing the operation of the bypass valves used in the flight control systems of FIGS. 1-4.

BEST MODE FOR CARRYING OUT THE INVENTION

Figure 1:
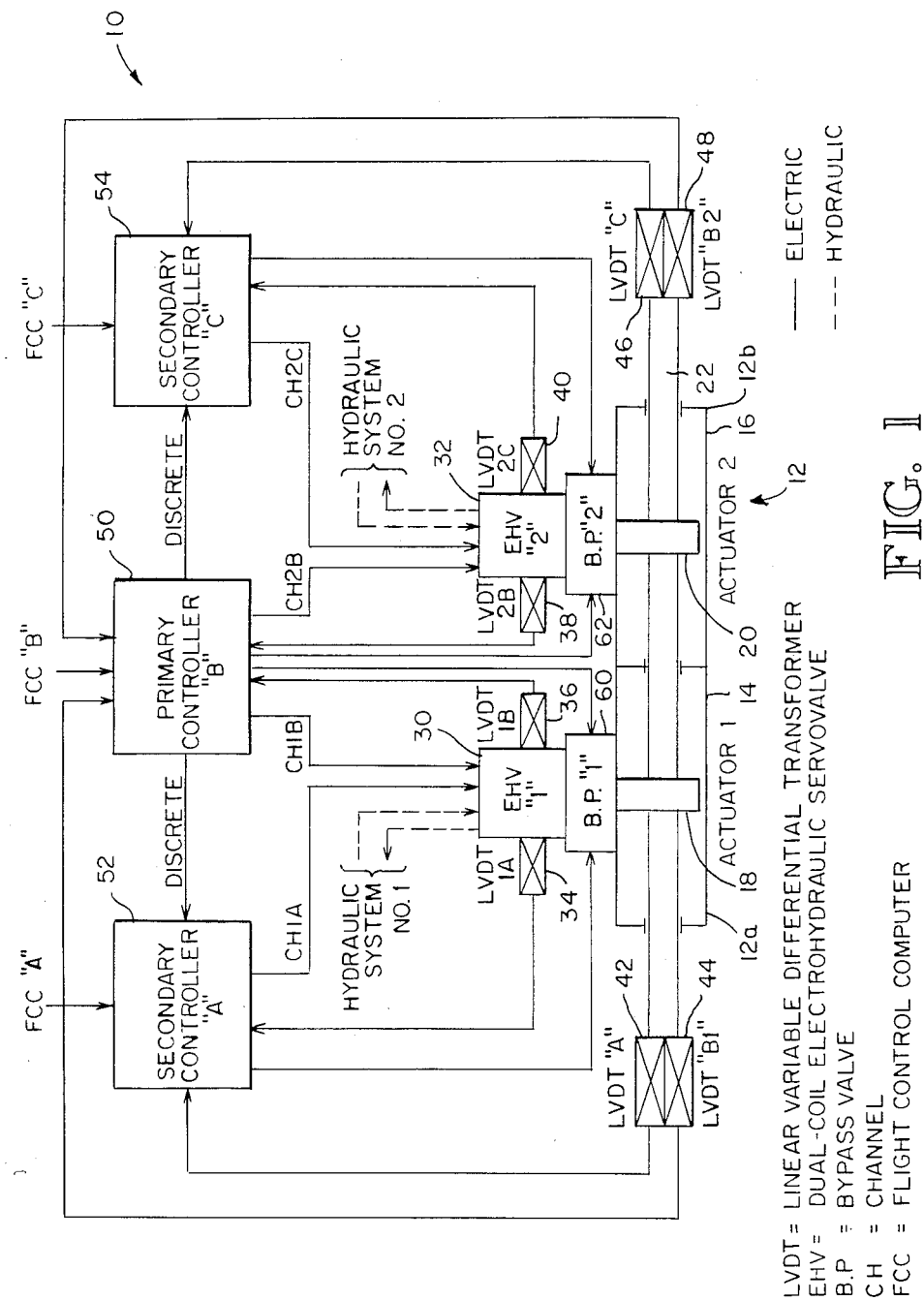
FIG. 1 is a block diagram of one embodiment of the inventive flight control system.

The inventive flight control, as illustrated in FIG. 1, utilizes a dual actuator 12 having a pair of hydraulic cylinders 14, 16 containing respective pistons 18, 20 mounted on a common actuating rod 22. The actuating rod 22 is coupled in a conventional manner to a flight control surface, such as an aileron, elevator or rudder. By the use of a common actuating rod 22, the hydraulic forces exerted on the pistons 18, 20 are mechanically summed so that the dual actuator 12 continues to operate, although at half its former actuating force, in the event of a malfunction in one-half of the dual actuator 12 or the components controlling the dual actuator 12.

The flow of hydraulic fluid into and out of each cylinder 14, 16 of the dual actuator 12 is controlled by dual-coil electrohydraulic servovalves 30, 32. Each of the electrohydraulic servovalves 30, 32 is driven by its own conventional hydraulic system so that a hydraulic system malfunction will affect only one-half of the dual actuator 12. As is well understood in the art, the electrohydraulic servovalves 30, 32 include a control coil (not shown) that receives an electrical signal. The electrical signal displaces a valve spool, thereby allowing hydraulic fluid to flow into and out of the cylinders 14, 16. The electrical signals applied to the control coils of the electrohydraulic servovalves thus control the rate at which hydraulic fluid flows into or out of the hydraulic cylinders 14, 16, which, in turn, controls the rate of actuating rod movement 22.

The position of the valve stem in each electrohydraulic servovalve 30, 32 is monitored by respective pairs of conventional linear variable differential transformers 34, 36 and 38, 40. The linear variable differential transformers ("LVDTs") generate electrical signals that are proportional to the position of their respective valve spool. Consequently, the signals generated by the LVDTs are proportional to the rate at which the hydraulic fluid is flowing into and out of the cylinders 14, 16, which is, in turn, proportional to the rate of movement of the actuating rod 22.

Conventional LVDTs 42, 44, 46, 48 are coupled to the actuating rod 22 to provide signals indicative of the position of the actuating rod. As explained in greater detail below, the outputs of the LVDTs 42, 44, 46, 48 are used as feedback signals to compare with the flight control signals from conventional flight control computers to generate the signals applied to the actuating coils of the electrohydraulic servovalves 30, 32.

The above-described components are common to all four embodiments of the inventive flight control system. The differences between the several embodiments of the flight control system stem from the manner in which these components are controlled.

In the embodiment of FIG. 1, the electrohydraulic servovalves 30, 32 are, in normal operation, driven by a primary controller 50 on the basis of a flight control signal from a respective flight control computer FCC "B." The primary controller 50 has a CH 1B output that drives one control coil of the electrohydraulic servovalve 30 and a CH 2B output that drives one control coil of the electrohydraulic servovalve 32. Negative feedback for the electrohydraulic servovalve 30 is provided by LVDT "B1" 44, while negative feedback for electrohydraulic servovalve 32 is provided to the primary controller 50 by the LVDT "B2." As explained in greater detail below, valve monitor signals generated by respective LVDTs 36, 38 are applied to the primary controller 50 so that the primary controller 50 can monitor the operation of the electrohydraulic servovalves 30, 32. The valve monitor signals from the LVDTs 36, 38 are compared to each other and to respective model signals that correspond to the expected valve monitor signals for a given flight control signal. In the event that a valve monitor signal from an LVDT 36, 38 differs from the other valve monitor signal and from the valve model signals, the output signal from the primary controller 50 for the affected electrohydraulic servovalve 30, 32 terminates, and a discrete signal is applied to a secondary controller 52, 54 for the affected electrohydraulic servovalve 30, 32. Thereafter, the electrohydraulic servovalve 30, 32 is driven by a secondary controller 52, 54 which then applies a control signal to a separate actuating coil in each of the electrohydraulic servovalves 30, 32. Thus, in the event that the valve monitor signal from LVDT 1B 36 does not correspond to the valve monitor signal from the LVDT 2B 38 and to the valve model signals in the primary controller 50, the primary controller 50 will deactivate channel CH 1B and send a DISCRETE signal to the secondary controller "A" 52. Thereafter, secondary controller "A" 52 will drive the electrohydraulic servovalve 30 through its own actuating coil. It should be emphasized that each of the electrohydraulic servovalves 30, 32 receives a signal from only controller 50 or 52, 50 or 54, respectively, at a time.

In the event that both channels of the primary controller 50 and one of the secondary controllers 52 or 54 driving an electrohydraulic servovalve 30, 32, respectively, fail, one of the two electrohydraulic servovalves fails and then becomes inoperative. In order to prevent hydraulic locking of the piston 18, 20 for the failed electrohydraulic servovalve 30 or 32, respectively, a conventional bypass valve 60 or 62 is actuated by the controllers to allow hydraulic fluid to freely flow from one end of each cylinder 14 or 16 to the other. When the channel CH 1B output of the primary controller 50 is disabled, the primary controller sends a bypass signal to the bypass valve 60. However, the bypass valve 60 does not become operative until a second bypass signal is received from the secondary controller 52. In the event that an incorrect valve monitor signal from the LVDT 1A 34 is found to exist, the secondary controller 52 applies a second bypass signal to the bypass valve 60 at which point the bypass valve 60 moves to the bypass position. The operation of the bypass valve 62 for the electrohydraulic cylinder 16 is controlled by the primary controller 50 and the secondary controller 54 in the same manner.

As is well known in the art, the bypass valves 60, 62 are spring-biased to their bypass position and held in a non-bypass position by hydraulic pressure and by the outputs from the primary controller 50 and the secondary controllers 52, 54. Thus, in the absence of hydraulic pressure or of the proper signals applied to the electrohydraulic servovalves 30, 32, the bypass valves 60, 62 automatically move to their bypass position. Although it is possible for the bypass valves 60, 62 to fail in their non-bypass position, thereby hydraulically locking the actuating rod 22, this condition is highly unlikely.

An analysis of the failure modes of the components in the flight control system of FIG. 1 makes apparent the inherent reliability of the system. The system can achieve two electrical and one hydraulic failure and still operate effectively. If a malfunction, including failure of the flight control computer, occurs upstream of the electrohydraulic servovalves 30, 32, the malfunction is considered an electrical failure. Any malfunction of the electrohydraulic servovalves 30, 32 or loss of hydraulic pressure to the valves 30, 32 would be considered a hydraulic malfunction.

In the event of an electrical failure in one channel CH 1B or CH 2B of the primary controller "B" 50, the failure detection logic of the primary controller 50 recognizes the malfunction and switches off the operation of the failed channel CH 1B and activates the secondary controller 52 by sending out a DISCRETE signal to the secondary controller 52. The secondary controller "A" 52 then operates in the active control mode, and the channel CH 1B of the primary controller "B" 50 is deactivated so that the electrohydraulic servovalve 30 is thereafter controlled by the secondary controller 52 CH 1A channel through the coil of the electrohydraulic servovalve 30 connected to the secondary controller 52. Thus, in the event of a single channel failure of the primary controller 50, the dual actuator 12 remains fully operational. In the event of a failure of the other channel CH 2B of the primary controller 50, the primary controller 50 will switch the secondary controller 54 to its active mode, as described above with reference to secondary controller 52. Thereafter, the electrohydraulic servovalve 32 will be driven by the secondary controller 54 through the actuating coil of the electrohydraulic servovalve 32 connected to the secondary controller 54. Thus, in the event of a malfunction in both channels CH 1B and CH 2B of the primary controller 50, the dual actuator 12 will remain fully operational.

Let us assume that both channels of the primary controller 50 and/or the actuating coils of the electrohydraulic servovalves 30, 32 driven by the primary controller 50 have failed, so that control of the actuator 12 is now through the secondary controllers 52, 54. If either of the secondary controllers 52 or 54 and/or the actuating coils connected to the secondary controllers 52, 54 malfunction, the affected secondary controllers 52, 54 will detect the malfunction in the manner explained in detail below. The affected secondary controller (e.g., 52) is then deactivated, thereby applying a second bypass signal to the bypass valve 60, which previously received a bypass signal from the primary controller 50 when the channel CH 1B malfunctioned. The bypass valve 60 then shifts to its bypass position, thereby allowing, in effect, hydraulic fluid to flow freely around the piston 18. At the same time, the electrohydraulic servovalve 30, of course, becomes inoperative because the CH 1B channel of the primary controller 50 and the secondary controller 52 have both malfunctioned. Nevertheless, the flight control system remains operative, although the force that can be generated by the actuator 12 is reduced by about fifty percent.

There are two possible failure modes for the bypass valves 60, 62. The bypass valves 60, 62 can fail either by erroneously shifting to a bypass mode or by not shifting to a bypass mode when commanded. The unwanted shifting of the bypass valve 60 or 62 to a bypass mode during operation of the actuator 12 will result in loss of one actuator operation. This failure reduces the force output capability of the dual actuator 12, and the redundancy of the system is reduced. A more serious problem is that of the bypass valves 60, 62 not shifting into the bypass mode after receiving two bypass commands from the controllers 52, 50 or 50, 54 controlling the valves 60, 62, respectively. This failure can result in hydraulic locking, thus making the dual actuator 12 inoperable. For this reason, the operation of the bypass valves 60, 62 should be periodically checked. However, since the bypass valves 60, 62 are biased to their bypass mode by a spring, a failure of the bypass valves 60, 62 to bypass when commanded is unlikely.

It is important to note that a failure of any component in the chain of a primary or secondary controller 50, 52, 54 is treated in the same manner. Thus, a failure of the flight control computer FCC generating the flight control signal FCC "A," a failure of the secondary controller 52, a failure of the actuating coil driving the electrohydraulic servovalve 30, a failure of the LVDT 1A 34 and a failure of the LVDT "A" 42 will all be detected as a failure of the secondary controller "A" 52. Thus, the number of failures that can occur with the system remaining operational is substantially higher when the failed components are all in one controller chain. The worst case of failure mode occurs when a single component in each of three different controller chains occurs (e.g., both channels of primary controller 50 and secondary controller 52), in which case the actuator 12 continues to be operated by a single controller 54, a single electrohydraulic servovalve 32 and one-half of the dual actuator 12.

Figure 2:
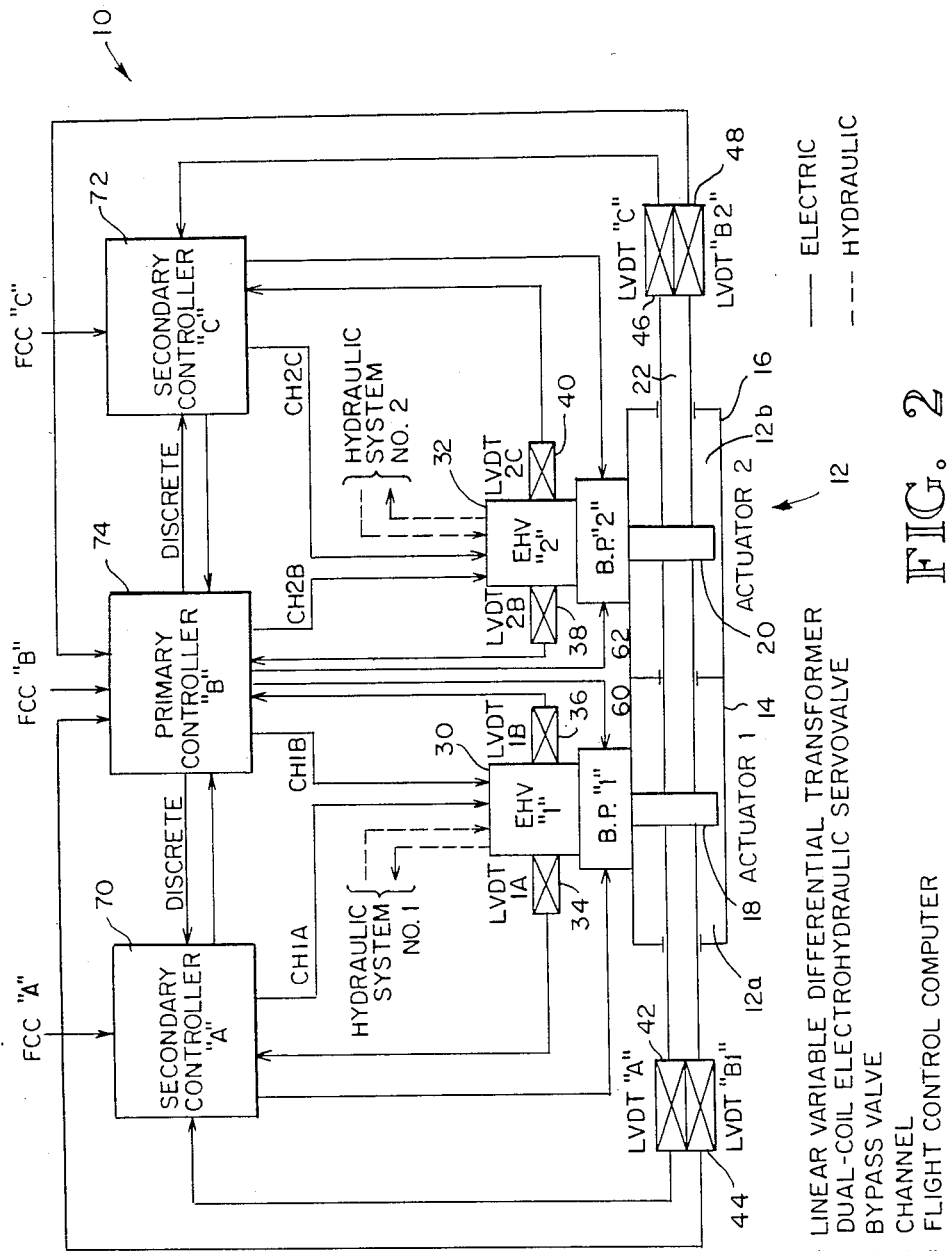
FIG. 2 is a block diagram of another embodiment of the inventive flight control system.

The flight control system illustrated in FIG. 2 is very similar to the flight control system illustrated in FIG. 1, since it employs most of the same components operating in the same manner. Consequently, identical components operating in the same manner have been given identical reference numerals. The flight control system as illustrated in FIG. 2 utilizes secondary controllers 70, 72, including voting and switching logic that is similar to the voting and switching logic in the secondary controller 52 and 54 in the embodiment of FIG. 1. Further, the secondary controller is capable of generating a discrete signal which is applied to the primary controller 74. The secondary controllers 70, 72 can thus detect disagreement between the valve monitor signals applied to the secondary controller 70, 72 and internally generated valve modeling signals. If the valve monitor signals do not match these other signals, the secondary controller 70, 72 can send a DISCRETE signal to the primary controller 74. Consequently, in the event of a malfunction of any controller or any input upstream to any controller, the failed controller channel can be voted out through cross-channel voting.

The cross-channel voting capability of the embodiment in FIG. 2 can be considered in greater detail by examining the various failure modes when the actuation system is in normal operational mode, both electrohydraulic servovalves 30 and 32 receive control inputs from CH 1B and CH 2B, respectively, of the primary controller 74, and both secondary controllers 70 and 72 monitor the actuator operation.

In one failure mode, it is assumed that the flight control computer "A," which drives the secondary controller 70, has failed. Under these circumstances, the monitoring signals from LVDT 1A 34 will not match with the model signals of secondary controller 70. Therefore, secondary controller 70 provides a discrete signal to primary controller 74 to notify primary controller 74 about the failure of secondary controller 70. As the flight control computer "C" and secondary controller 72 operate correctly, the monitoring signals from LVDT 2C 40 match the model signals in secondary controller 72. Therefore, secondary controller 72 will not provide discrete signals to primary controller 74. Additionally, primary controller 74 operates without failures, and the monitoring signals from LVDT 1B and LVDT 2B match with models created in primary controller 74.

Thus, the conventional logic circuitry forming part of the primary controller "B" 74 recognizes that the signals of CH 1B, CH 2B and CH 2C will all match each other and that only CH 1A failed, which is the signal created in secondary controller "A." Then, primary controller "B" 74 provides a discrete signal to secondary controller "A" 70 to stop the operation of controller "A" 70 until the failure condition exists in controller "A" 70 or upstream of this controller.

A second failure mode involves a failure in the flight control computer "C," upstream from secondary controller 72. This failure mode is treated in the same manner as the preceding example, except that secondary controller 72 is voted out in the same manner that secondary controller 70 was voted out in the preceding example.

In this manner, cross-channel voting allows a failure upstream from controller 70 or controller 72 to be detected without disturbing the actuator operation, which has remained under the control of primary controller 74.

In a third failure mode, the flight control computer "B," which drives primary controller 74, fails, so the monitoring signals from LVDT 1A 34 and LVDT 2C 40 will not match the model signals in secondary controllers 70 and 72. Therefore, the failure detection logic of each secondary controller, controllers 70 and 72, provides a discrete signal to primary controller 74, which indicates that CH 1A and CH 2C disagree with CH 1B and CH 2B. Two secondary controllers, 70 and 72, then vote out primary controller 74, even though the valve model signals in primary controller 74 match their respective valve monitor signals from the LVDT 1B 36 and LVDT 2B 38.

After primary controller 74 is voted out, the two secondary controllers 70 and 72 are activated, and the actuator remains fully operational with the two secondary controllers.

In the event that a malfunction causes one false DISCRETE signal to be generated by any of the controllers 70, 72 or 74 without mismatch of valve monitoring and valve model signals, the result is a shutdown of one of the secondary controllers. Dual actuator 12 remains fully operational with primary controller 74 and one secondary controller. Simultaneous malfunctions of both DISCRETE signals from each secondary controller are needed to shut down primary controller 74, but dual actuator 12 remains fully operational.

The DISCRETE signals should be active low so that a complete failure in any controller 70, 72 or 74 will cause the controller to generate no output to its associated electrohydraulic servovalve coil and a DISCRETE signal to activate the standby controller. Using a DISCRETE signal that is active low also prevents both coils of the same electrohydraulic servovalve from being active at the same time.

Failure detection is accomplished in the secondary controllers 70, 72 by comparing their internal valve model signals to the valve monitor signals from the LVDT's 34, 40, respectively. In the event that these signals differ by more than a predetermined value, both secondary controllers 70, 72 would send DISCRETE signals to the primary controller 74 to cause the primary controller 74 to be deactivated. At the same time, the secondary controller 70 drives the electrohydraulic servovalve 30 through its internal actuating coil. Thus, in the event of a malfunction in the primary controller 74 that prevents it from recognizing a malfunction, this function can be performed by the secondary controllers 70, 72.

Figure 3:
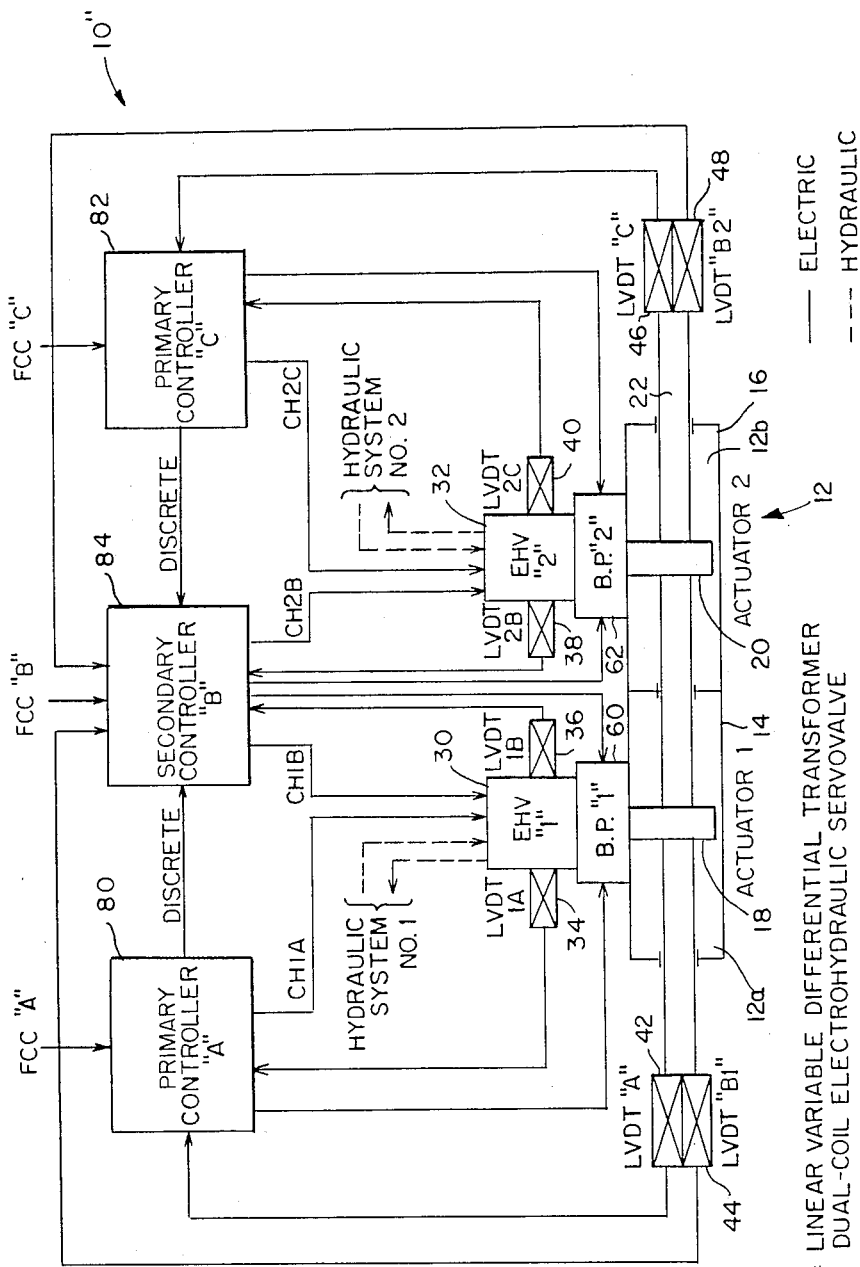
FIG. 3 is a block diagram of another embodiment of the inventive flight control system.

The embodiment of the inventive flight control system of FIG. 3, like the embodiment of FIG. 2, employs a number of components used in the embodiment of FIG. 1 which operate in the same manner. Consequently, these components have been given the same reference numerals. The embodiment illustrated in FIG. 3 differs from the embodiment shown in FIG. 1 in that it uses a pair of primary controllers 80, 82 to drive the electrohydraulic servovalves 30, 32, respectively, in the normal operating mode. The primary controller 80 outputs a control signal to its respective actuating coil of electrohydraulic servovalve 30 through channel 1A, while primary controller 82 outputs a control signal to the actuating coil of electrohydraulic servovalve 32 through channel 2C. A secondary controller 84 has two channels, 1B and 2B, connected to respective actuating coils of the electrohydraulic servovalves 30, 32, respectively. In the event of a malfunction in one of the primary controllers 80, 82 or in the actuating coils connected to the primary controllers 80, 82, the failure is recognized by the primary controllers 80, 82 for the affected channel. The primary controller 80, 82 for the affected channel then outputs a DISCRETE signal to the secondary controller 84, deactivates its control channel 1A or 2C, and applies a bypass signal to the bypass valve 60 or 62. Thereafter, a channel of the secondary controller 84 controls the electrohydraulic servovalve 30 or 32. If a second failure occurs in a channel driving the same electrohydraulic servovalve 30 or 32, one-half of the dual actuator 12 becomes inoperable, as explained above with reference to FIG. 1. The electrohydraulic servovalve monitoring and valve modeling in the embodiment of FIG. 3 are the same as in the embodiment of FIG. 1.

Figure 4:
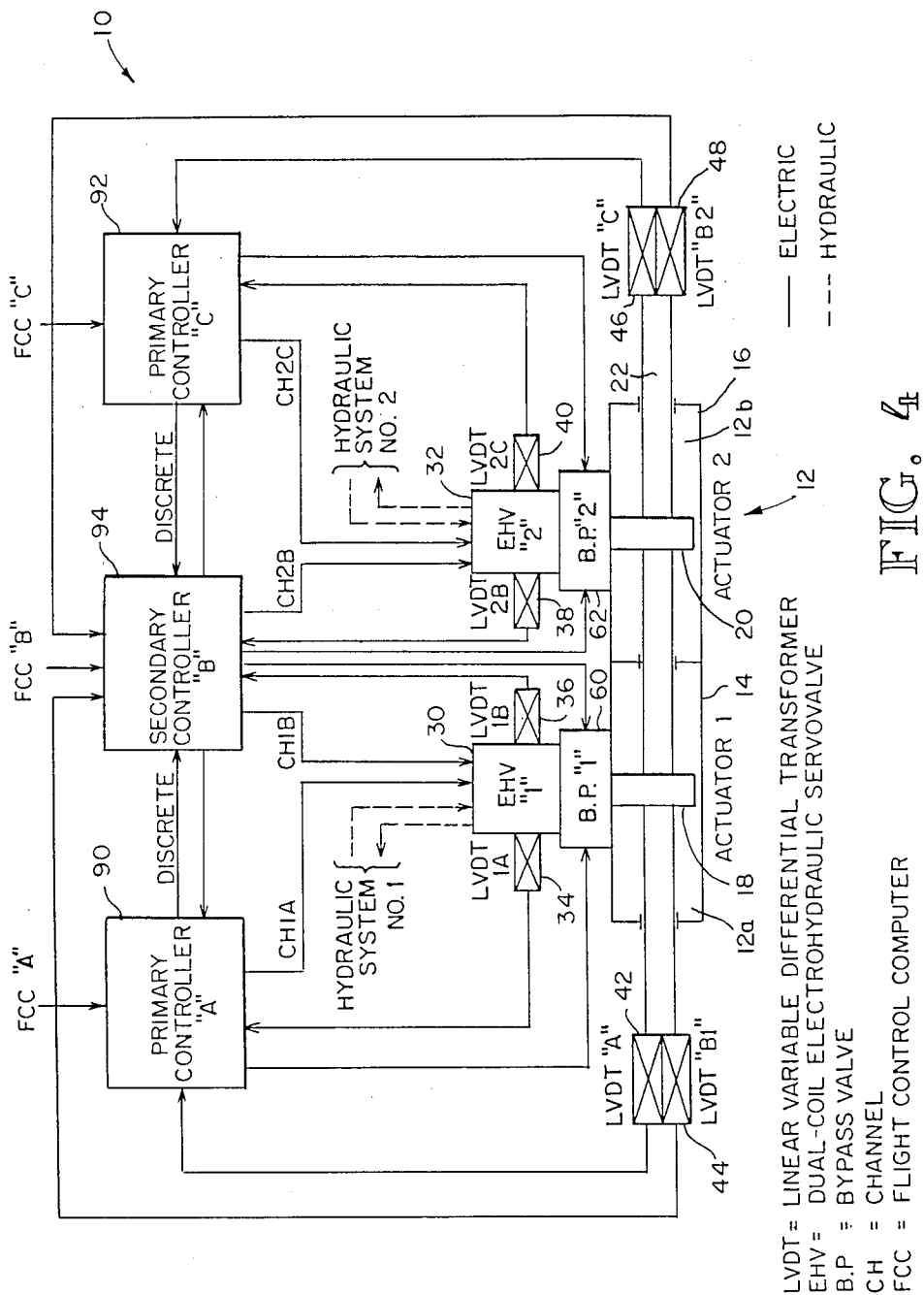
FIG. 4 is a block diagram of another embodiment of the inventive flight control system.

The embodiment of FIG. 4, like the previous embodiments, also utilizes a large number of components that are common to the earlier embodiments and are thus given identical reference numerals. The embodiment of FIG. 4 differs from the embodiment of FIG. 2 in that it, like the embodiment of FIG. 3, utilizes a pair of primary controllers 90, 92 and a single secondary controller 94. In normal operation, the electrohydraulic servovalves 30, 32 are driven by the primary controllers 90, 92. In the event of a failure in either of the primary controllers 90 or 92 or the coil of the electrohydraulic servovalve 30, 32, respectively, connected to the primary controllers 90 or 92, control is transferred to the secondary controller 94. Like the embodiment of FIG. 2, the embodiment of FIG. 4 utilizes a secondary controller 94 that is capable of detecting a malfunction in either of the primary controllers 90, 92 and then causing the primary controllers 90, 92 to transfer control to the proper channel of the secondary controller 94.

Figure 5:
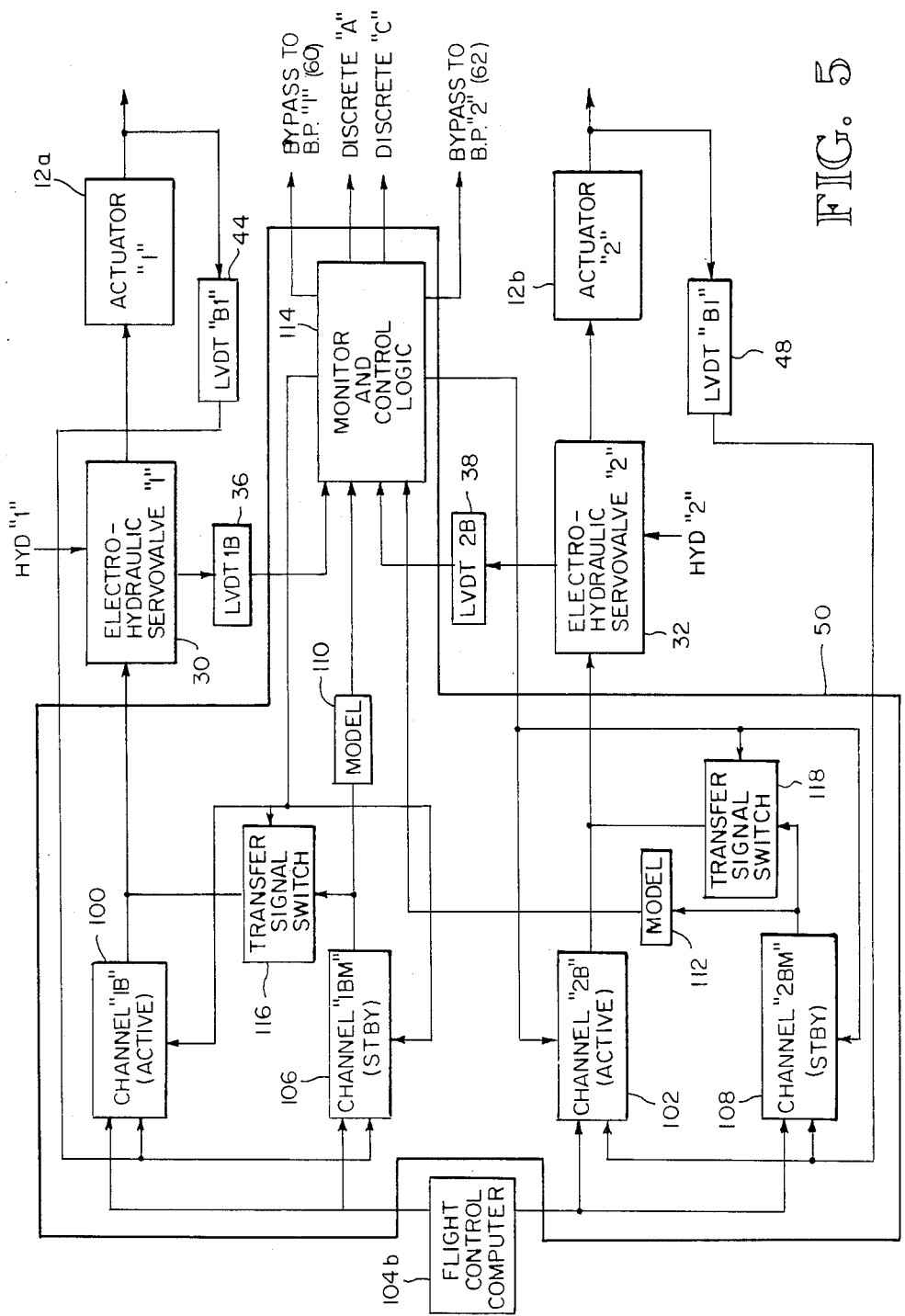
FIG. 5 is a block diagram of the primary controller employed in the flight control system of FIG. 1.

The primary controller 50 used in the embodiment of FIG. 1 is illustrated in greater detail in FIG. 5. The circuitry illustrated in FIG. 5 also includes the components of the flight control system illustrated in FIG. 1 that are connected to the primary controller 50, but it does not include the secondary controllers 52, 54 that are also connected to these components. The primary controller 50 may be implemented in a variety of forms without departing from the scope of this invention. More specifically, the components illustrated in FIG. 5 can be analog circuitry or digital circuitry. Moreover, the components can be implemented in whole or in part by a microprocessor which can easily be programmed by one skilled in the art to implement the components illustrated in FIG. 5. In the event that the components of the primary controller 50 are implemented by programming a microprocessor, the primary controller 50 preferably will utilize two microprocessors so that a malfunction in one microprocessor can be detected by the other microprocessor in order to discontinue operation of the primary controller 50 and generate DISCRETE signals to the secondary controllers 52, 54. Regardless of the manner of implementing the components illustrated in FIG. 5, they can easily be implemented by one skilled in the art using well-known circuit design or programming techniques.

The primary controller 50 includes a pair of active channels 100, 102 that generate an electrohydraulic servovalve control signal as a function of the difference between a flight control signal generated by an upstream flight control computer 104 and position feedback signals output by respective LVDTs 44, 48. The flight control signal from the flight control computer 104 and the actuator feedback signals from the LVDTs 44, 48 are also applied to respective standby channels 106, 108. The outputs of the standby channels are applied to respective model circuits 110, 112 of conventional design which have a transfer function selected to output a valve model signal that is identical or corresponds to the expected valve feedback signals from the LVDTs 36, 38. In other words, the expected effect of the flight control signal on each electrohydraulic servovalve 30, 32 is known and is simulated by the model circuits 110, 112. Further, the valve monitor signals that should be generated by the LVDTs 36, 38 for a given response of the electrohydraulic servovalves 30, 32 are also known. Consequently, the expected valve monitor signals from the LVDTs as a function of the flight control signals are also known. The transfer functions of the model circuits 110, 112 are selected so that the valve model signals generated by the model circuits 110, 112 will be identical or correspond to these expected valve monitor signals. The valve feedback signals from the LVDTs and the model signals from the model circuits 110, 112 are then applied to a monitor and control logic circuit 114. As explained in greater detail below, the monitor and control logic circuit 114 compares each of the valve feedback signals from the LVDTs 36, 38 to each other and to the valve model signals from the model circuits 110, 112. In the event that one of the valve feedback signals does not correspond to the other valve feedback signal or to the valve model signals, the monitor and control logic 114 actuates a transfer signal switch 116, 118 for the affected channel, thereby using the standby channel 106 or 108 to generate the control signal for the electrohydraulic servovalves 30, 32.

For example, if the monitor and control logic 114 determines that the valve monitor signal from the LVDT 36 does not correspond to the valve monitor signal from the LVDT 38 or to the model signals from the model circuits 10, 112, it actuates transfer switch 116 so that the output of the standby channel 106 is then applied to the electrohydraulic servovalve 30. If the improper valve monitor signal from LVDT 36 was a result of a malfunction in the active channel circuit 100, the primary controller 50 will once again be operative in driving the electrohydraulic servovalve 30.

An incorrect valve monitor signal from the LVDT 36 may be due to a malfunction in a component other than the active channel circuit 100. For example, the malfunction may be due to a malfunction in the actuating coil driving the electrohydraulic servovalve 30. In this case, actuating the transfer signal switch 116 to allow the standby channel 106 to generate the control signal will not correct the malfunction. The monitor and control logic 114 will continue to recognize the malfunction and thus apply a DISCRETE "A" signal to the secondary controller 52 to transfer control of the electrohydraulic servovalve 30 to the secondary controller 52.

Although the primary controllers 74, 80, 82, 90, 92 and the secondary controllers 70, 72, 84, 94 for the embodiments of FIGS. 2–4 are not illustrated in detail, their design will be apparent to one skilled in the art from a review of the primary controller 50 illustrated in FIG. 5 for the embodiment of FIG. 1.

Figure 6:
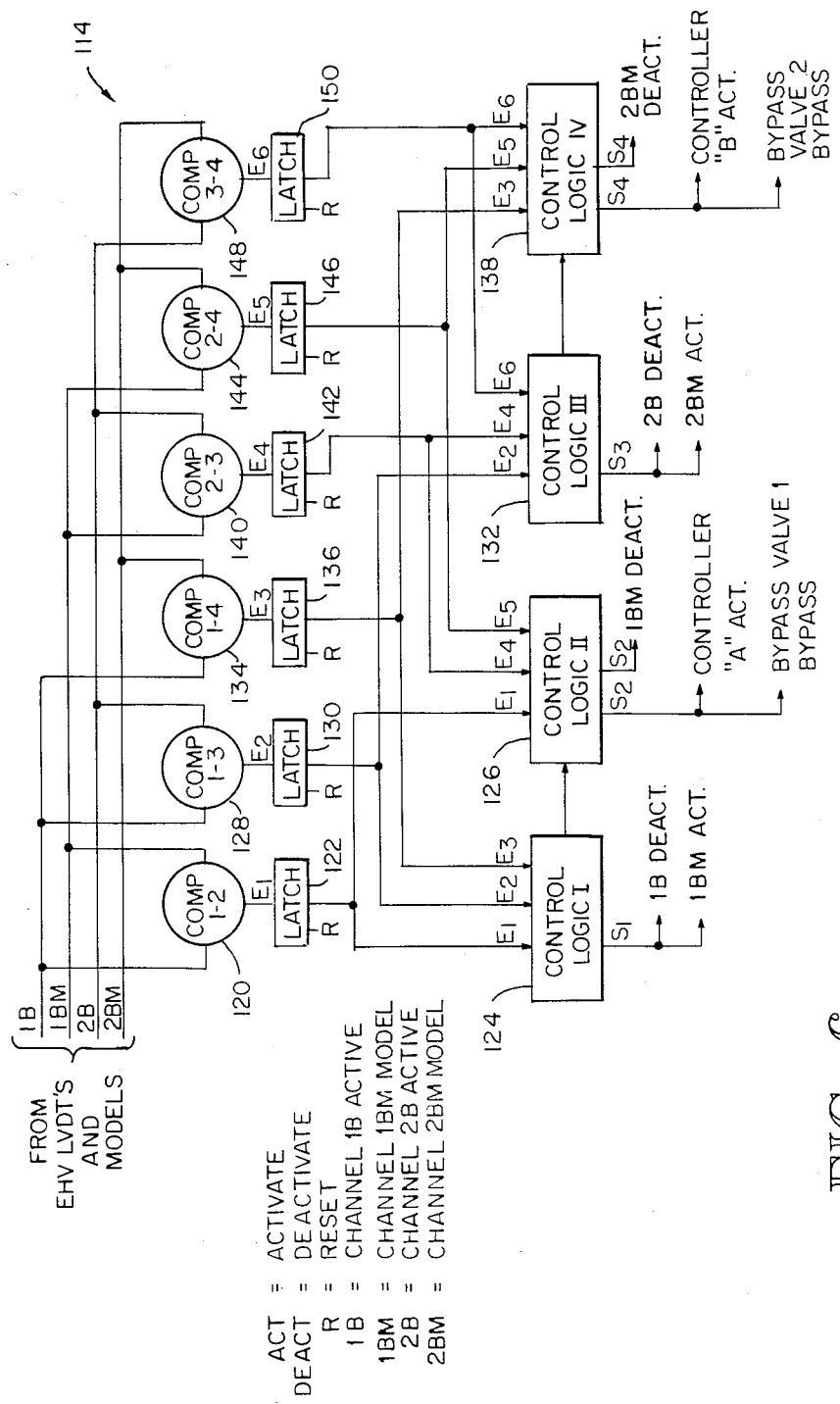
FIG. 6 is a block diagram showing the control logic for detecting a malfunctioning component in the dual channel B controllers of the flight control sytems of FIGS. 1-4.

The monitor and control logic 114 used in the primary controller 50 (FIG. 5) is illustrated in greater detail in FIG. 6. Once again, the components illustrated in FIG. 6 can be implemented in a variety of forms, including digital or analog circuits or a properly programmed microprocessor. The monitor and control logic circuit 114 receives valve monitor signals 1B and 2B from the LVDTs 36, 38, respectively. It also receives valve model signals 1 BM and 2 BM from the model circuits 110, 112. The 1B valve monitor signal is first compared to the 1 BM valve model signal by comparator 120. In the event of a negative comparison, the comparator 120 sets a latch 122, thereby generating a high $E_1$ signal. This $E_1$ signal is applied to control logic circuits 124, 126, which may be, for example, merely AND gates.

The 1B valve monitor signal is also compared to the 2B valve monitor signal by comparator 128 and, in the event of a negative comparison, the comparator 128 sets latch 130. Latch 130 then generates an $E_2$ signal that is applied to the control logic circuit 124 and to a third control logic circuit 132.

Finally, the 1B valve monitor signal is compared to the 2 BM valve model signal by comparator 134, which, in the event of a negative comparison, triggers latch 136. Latch 136 then generates an $E_3$ signal that is applied to the control logic circuit 124 and to a fourth logic circuit 38.

In a similar manner, the 1 BM valve model signal and 2B valve monitor signal are compared by comparator 140 and, in the event of a negative comparison, latch 142 is triggered to apply an $E_4$ signal to the control logic circuits 126 and 132. The 1 BM valve model signal is compared to the 2 BM valve model signal in comparator 144 and, in the event of a negative comparison, latch 146 is triggered to apply an $E_5$ signal to the control logic circuits 126 and 138. Finally, the 2B valve monitor signal is compared to the 2 BM valve model signal by comparator 148 to trigger latch 150 in the event of a negative comparison. Latch 150 then applies an $E_6$ signal to the control logic circuits 132, 138.

The $E_1$, $E_2$ and $E_3$ signals will all be high whenever the 1B valve monitor signal does not match either the 2B valve monitor signal or either of the valve model signals, thus indicating that the 1B channel 100 (FIG. 5) is faulty. The control logic circuit 124 then generates an $S_1$ signal to deactivate the active channel 100 (FIG. 5) and activate the standby channel 106. Additionally, the control logic circuit 124 provides an enable signal to control logic 126 to notify the loss of the 1B channel 100. Similarly, the $E_1$, $E_4$ and $E_5$ signals are all high whenever the valve model signal 1 BM does not match the other valve model signal or either of the valve monitor signals, thus indicating that either the standby channel 106 has also malfunctioned or the malfunction is in the electrohydraulic servovalve 30 or LVDT 36. The control logic circuit 126 thus outputs a high $S_2$ signal that applies a bypass signal to the bypass valve "1" 60 and sends a DISCRETE signal to the secondary controller 52. The control logic circuits 132, 138 operate in a manner similar to control logic circuits 124, 126, respectively, to control the operation of the channel 2B of the primary controller 50 in the event of a malfunction. The operation of the monitor and control logic circuit 114, as explained with reference to FIG. 6, is summarized in the truth table illustrated in FIG. 7.

Figure 8:
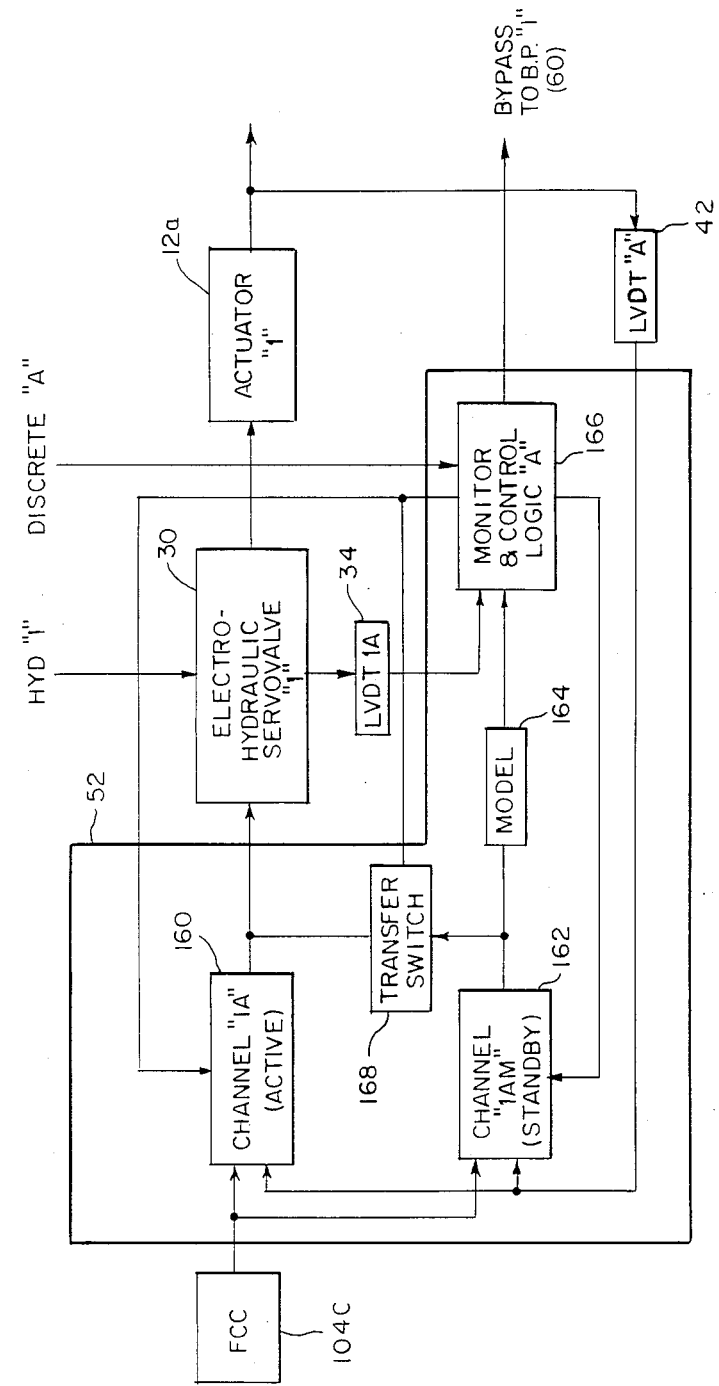
FIG. 8 is a block diagram of a secondary controller employed in the flight control system of FIG. 1.

The secondary controllers 52, 54, utilized in the embodiment of FIG. 1 are illustrated in FIG. 8. It will be apparent from a comparison of FIGS. 5 and 8 that the secondary controllers 52, 54 are somewhat similar to one-half of the primary controller 50. Thus, like the primary controller 50, the secondary controllers 52, 54 include an active channel 160 and a standby channel 162. The active channel 160 generates a control signal that is applied to one actuating coil of the electrohydraulic servovalve 30. The control signal is a function of the difference between a flight control signal from the flight control computer 104C and an actuator position feedback signal generated by the LVDT "A" 42. The output of the standby channel "1 AM" 162 is applied to a conventional valve model circuit 164 that generates a valve model signal corresponding to the expected valve monitor signal for a given flight control signal. The valve monitor signal from the LVDT "1A" 34 and the valve model signal from the valve model circuit 164 are applied to a monitor and control logic circuit 166 that operates in a manner similar to the operation of the monitor and control logic circuit 114 (FIG. 5) of the primary controller 50, as explained above with reference to FIGS. 6 and 7. In the event of a malfunction in the channel 1A (FIG. 1) the valve monitor signal from the LVDT "1A" 34 will differ from the valve model signal, at which point the monitor and control logic circuit 166 will actuate a transfer switch 168 to allow the standby channel "1 AM" 162 to take over control of the electrohydraulic servovalve 30. In the event that the monitor and control logic circuit 166 of the secondary controller 52 continues to detect an improper valve monitor signal from the LVDT "1A" 34, the control logic circuit 166 will deactivate the standby channel 162. The monitor and control logic circuit 166 will then apply a bypass signal to the bypass valve "1" 60 to bypass the piston 18 and the hydraulic cylinder 14.

The operation of the bypass valves is illustrated in the truth table of FIG. 9. Basically, as illustrated in FIG. 9, actuator 12A is not bypassed until a bypass signal has been sent to the bypass valve 60 by both the primary controller 50 and the secondary controller 52 ("possibility #6"). Similarly, the actuator 12B is not bypassed until the primary controller 50 and the secondary controller 54 each send a bypass signal to the bypass valve 62. Both actuators 12A, 12B do not become bypassed until both bypass valves 60, 62 each receive two bypass signals. At this point, of course, the flight control system becomes inoperative.

It is thus seen that the inventive flight control system utilizes a relatively small number of components to achieve a remarkable degree of redundancy. This redundancy allows the flight control system to achieve two independent electrical and one hydraulic failure without jeopardizing the operation of the system. Moreover, the inventive flight control system can detect and react to malfunctions in upstream components such as the flight control computers.

I claim:

1. A hydraulic flight control system comprising:
a tandem hydraulic actuator having an actuating rod connected to a pair of pistons mounted in respective first and second cylinders;
first and second electrohydraulic servovalves controlling the flow of hydraulic fluid into and out of said first and second hydraulic cylinders, respectively, each of said electrohydraulic servovalves being controlled by a pair of actuating coils;
first, second and third controller means receiving a flight control signal, said first controller means having a control channel that is capable of providing an output to one actuating coil of said first electrohydraulic servovalve for operating said first electrohydraulic servovalve, said second controller means having a control channel that is capable of providing an output to one actuating coil of said second electrohydraulic servovalve for operating said second electrohydraulic servovalve, said third control having first and second control channels that are capable of providing respective outputs to the other actuating coils of said first and second electrohydraulic servovalves for operating either or both of said electrohydraulic servovalves; and
monitor and control logic means for monitoring the performance of said controller means, electrohydraulic servovalves and actuator, said monitor and control logic means selectively enabling said controller means so that each of said electrohydraulic servovalves is operated by only one controller means at a time and, in the event of a malfunction in the performance of one electrohydraulic servovalve or controller means driving said electrohydraulic servovalve, enabling the other controller means connected to said electrohydraulic servovalve.

2. The flight control system of claim 1, further comprising:
a pair of valve position sensors operatively associated with each of said electohydraulic servovalves, said sensors generating respective outputs indicative of the operation of said valves, said outputs providing valve feedback signals to the respective controller means that are connected to said valves; and
comparator means receiving the feedback signals from said valve position sensors and comparing said valve feedback signals to each other to provide an indication of a failure in the event of a negative comparison.

3. The flight control system of claim 2 wherein said comparator means further compares said valve feedback signals to respective reference signals that correspond to the expected values of said feedback signals as a function of said flight control signals, thereby providing an additional indication of a failure in the event of a negative comparison 4. The flight control system of claim 1, further comprising:
a pair of valve position sensors operatively associated with each of said electrohydraulic servovalves, said sensors generating respective outputs indicative of the operation of said valves, said outputs providing valve feedback signals to the respective controller means that are connected to said valves; and
comparator means receiving the valve feedback signals from said valve position sensors and comparing said valve feedback signals to respective reference signals that correspond to the expected values of said valve feedback signals as a function of said flight control signal, thereby providing an indication of a failure in the event of a negative comparison 5. The flight control system of claim 2 wherein said third controller means further includes first and second model channels operated in tandem with respective first and second control channels of said third controller means, said model channels generating from said flight control signal respective first and second valve model signals corresponding to the valve feedback signals that respective valve position sensors would be expected to generate in response to said flight control signal, and wherein said flight control system further comprises:
first comparator means comparing the valve feedback signal from said first electrohydraulic servovalve with the valve feedback signal from said second electrohydraulic servovalve and said first and second valve models signals and, in the event that the valve feedback signal from said first electrohydraulic servovalve does not correspond to the valve feedback signal from said second electrohydraulic servovalve and to said first and second valve model signals, said first comparator means deactivating said first control channel and driving said first electrohydraulic servovalve with a signal derived from said first model channel; and
second comparator means thereafter comparing said first valve model signal with said second model signal and said first and second valve feedback signals and, in the event that said first valve model signal does not correspond to said second valve model signal and to said first and second valve feedback signals, said second comparator means deactivating said first model channel and enabling said first controller means so that said first electrohydraulic servovalve is thereafter operated by said first controller means through its respective first electrohydraulic servovalve control coil.

6. The electrohydraulic servovalve of claim 5 wherein said system further comprises:
third comparator means comparing said second valve feedback signal with said first valve feedback signal and said first and second valve model signals and, in the event that said second valve feedback signal does not correspond to said first valve feedback signal and to said first and second valve model signals, said third comparator means deactivating said second control channel and driving said second electrohydraulic servovalve with a signal derived from said second model channel; and
fourth comparator means thereafter comparing said second valve model signal with said first model signal and said first and second valve feedback signals and, in the event that said second valve model signal does not correspond to said first valve model signal and to said first and second valve feedback signals, said fourth comparator means deactivating said second model channel and enabling said second controller means so that said second electrohydraulic servovalve is thereafter operated by said second controller means through its respective second electrohydraulic servovalve control coil.

7. The flight control system of claim 1 wherein said system further includes a pair of valve position sensors operatively associated with each of said electrohydraulic servovalves, said sensors generating respective valve feedback signals indicative of the operation of said valves, and wherein said third controller means further includes first and second valve model channels operated in tandem with respect to first and second control channels of said third controller means, said valve model channels generating from said flight control signal respective first and second valve model signals corresponding to the valve feedback signals that respective valve position sensors would be expected to generate in response to said flight control signal, said third controller means further including transfer circuit means operative in the event of a control channel malfunction to apply a signal from the valve model channel corresponding to the malfunctioning control channel to the electrohydraulic servovalve coil to which the malfunctioning control channel is connected, whereby said valve model channels may be used as redundant control channels.

8. The flight control system of claim 2 wherein said system further includes a valve position sensor operatively associated with said first electrohydraulic servovalve, said sensor generating a valve feedback signal indicative of the operation of said valve, and wherein said first controller means further includes a valve model channel operated in tandem with the control channel of said first controller means, said valve model channel generating from said flight control signal a valve model signal corresponding to the valve feedback signal that said valve position sensor would be expected to generate in response to said flight control signal, said first controller means further including transfer circuit means operative in the event of a control channel malfunction to apply a signal derived from said valve model channel to the electrohydraulic servovalve coil to which said malfunctioning control channel is connected, whereby said valve model channel may be used as a redundant control channel.

9. The flight control system of claim 1, further including four position sensors coupled to said actuating rod generating respective actuator position signals indicative of the position of said actuating rod, said actuator position signals being coupled to the control channels of said controller means and being compared to said flight control signal to generate an error signal indicative of the difference between the actual position of said actuating rod and the position of said actuating rod designated by said flight control signal, said error signals being amplified by said controller means to provide respective outputs to said electrohydraulic servovalve actuating coil.

10. The flight control system of claim 1 wherein each of said controller means is driven by a respective flight control signal, thereby allowing said flight control system to continue operating in the event of a malfunction in the generation of at least one of said flight control signals.

11. The flight control system of claim 1 wherein said controller means further include cross-channel voting means for comparing the operation of said first, second and third controller means with each other to determine the existence and identity of a failed controller means.

12. The flight control system of claim 1 wherein said first and second electrohydraulic servovalves are driven by the control channels of said third controller means until one of said electrohydraulic servovalves or a control channel driving said electrohydraulic servovalve malfunctions, at which point the first or second controller means connected to said electrohydraulic servovalve is enabled.

13. The flight control system of claim 1 wherein said first and second electrohydraulic servovalves are driven by said first and second controller means, respectively, until one of said electrohydraulic servovalves or the controller means driving said electrohydraulic servovalve malfunctions, at which point the control channel of said third controller means that is connected to said electrohydraulic servovalve is enabled.

14. The flight control system of claim 1, further including bypass valve means for each of said cylinders, each of said bypass valve means being operative to bypass the piston in said cylinder responsive to malfunction of both controller means that are connected to the electrohydraulic servovalve controlling the flow of hydraulic fluid to said cylinder.

15. In an aircraft having at least one flight control surface and a flight control computer generating flight control commands from manual control inputs, an improved flight control system comprising:

a tandem hydraulic actuator having an actuating rod connected to a pair of pistons mounted in respective first and second cylinders, said actuating rod being connected to one of sad flight control surfaces;

first and second electrohydraulic servovalves controlling the flow of hydraulic fluid into and out of said first and second hydraulic cylinders, respectively, each of said electrohydraulic servovalves being controlled by a pair of actuating coils, said electrohydraulic servovalves each having a pair of valve operation sensors generating respective valve feedback signals indicative of the operation of said valves;

four actuator rod position sensors generating respective actuator rod position signals indicative of the position of said actuating rod;

primary controller means generating first and second control signals through respective first and second control channels as a function of said flight control signal and respective actuator rod position signals from two actuator rod position sensors, said first and second control channels being connected to one actuating coil of said first and second electrohydraulic valves, respectively;

first secondary controller means selectively generating a third control signal as a function of said flight control signal and an actuator rod position signal from a respective actuator rod position sensor, said first secondary controller being connected to the other actuating coil of said first electrohydraulic servovalve;

second secondary controller means selectively generating a fourth control signal as a function of said flight control signal and an actuator rod position signal from a respective actuator rod position sensor, said secondary controller being connected to the other actuating coil of said second electrohydraulic servovalve; and monitor and control means receiving said valve feedback signals, said monitor and control means comparing the valve feedback signals from each electrohydraulic servovalve to a respective reference signal corresponding to the expected valve feedback signal resulting from said flight control signal and, in the event that a valve feedback signal does not correspond to a respective reference signal, enabling the first or second secondary controller that is connected to the electrohydraulic servovalve that is generating the valve feedback signal that does not correspond to its respective reference signal.

16. The flight control system of claim 15 wherein said primary control further includes first and second valve model channels operated in tandem with respect to first and second control channels of said primary controller, said valve model channels generating respective reference signals from said flight control signals, said primary controller further including transfer circuit means operative in the event of a control channel malfunction to apply a signal from said valve model channel corresponding to the malfunctioning control channel to the electrohydraulic servovalve coil to which the malfunctioning channel is connected, whereby said valve model channels may be used as redundant control channels.

17. The flight control system of claim 15 wherein each of said controller means is driven by a respective flight control signal, thereby allowing said flight control system to continue operating in the event of a malfunction in the generation of at least one of said flight control signals.

18. In an aircraft having at least one flight control surface and a flight control computer generating flight control signals from manual control inputs, an improved flight control system comprising:

a tandem hydraulic actuator having an actuating rod connected to a pair of pistons mounted in respect to first and second cylinders, said actuating rod being connected to said flight control surface;

first and second electrohydraulic servovalves controlling the flow of hydraulic fluid into and out of said first and second hydraulic cylinders, respectively, each of said electrohydraulic servovalves being controlled by a pair of actuating coils, said electrohydraulic servovalves each having a pair of valve operation sensors generating respective valve feedback signals indicative of the operation of said valves;

four actuator rod position sensors generating respective actuator rod position signals indicative of the position of said actuating rods;

first primary controller means generating a first control signal as a function of said flight control signal and a respective actuator rod position from an actuating rod position sensor, said first primary controller means being connected to one actuator coil of said first electrohydraulic servovalve;

second primary controller means generating a second control signal as a function of said flight control signal and a respective actuator rod position signal from an actuating rod position sensor, said second primary controller means being connected to one actuating coil of said second electrohydraulic servovovalve;

secondary controller means selectively generating third and fourth control signals with respect to first and second control channels as a function of said flight control signal and respective actuator rod position signals from two actuator rod position sensors, said first and second control channels being connected to one actuating coil of said first and second electrohydraulic servovalves, respectively; and monitor and control means receiving said valve feedback signals, said monitor and control means comparing the valve feedback signal from each electrohydraulic servovalve to a respective reference signal corresponding to the expected valve feedback signal resulting from said flight control signal and, in the event that a valve feedback signal does not correspond to a respective reference signal, enabling the first or second control channel of said secondary controller that is connected to the electrohydraulic servovalve generating the valve feedback signal that does not correspond to its respective reference signal.

19. The flight control system of claim 18 wherein each of said primary controllers further includes a valve model channel operated in tandem with its control channel, said valve model channels generating respective reference signals from said flight control signal, each of said primary controllers further including transfer circuit means operative in the event of a control channel malfunction to apply a signal derived from said valve model channel to the electrohydraulic servovalve coil to which said malfunctioning control channel is connected, whereby said valve model channels may be used as redundant control channels.

20. The flight control system of claim 18 wherein each of said controller means is driven by a respective flight control signal, thereby allowing said flight control systems to continue operating in the event of a malfunction in the generation of at least one of said flight control signals.

21. The flight control system of claim 18 wherein said controller means further include cross-channel voting means for comparing the operation of said first, second and third controller means with each other to determine the existence and identity of a failed controller means.

* * * * *